Aug. 19, 1952 F. DE PETRILLO 2,607,395
APPARATUS FOR THE MANUFACTURE OF ORNAMENTAL ROD SHAPES
Filed Sept. 3, 1947 4 Sheets—Sheet 1
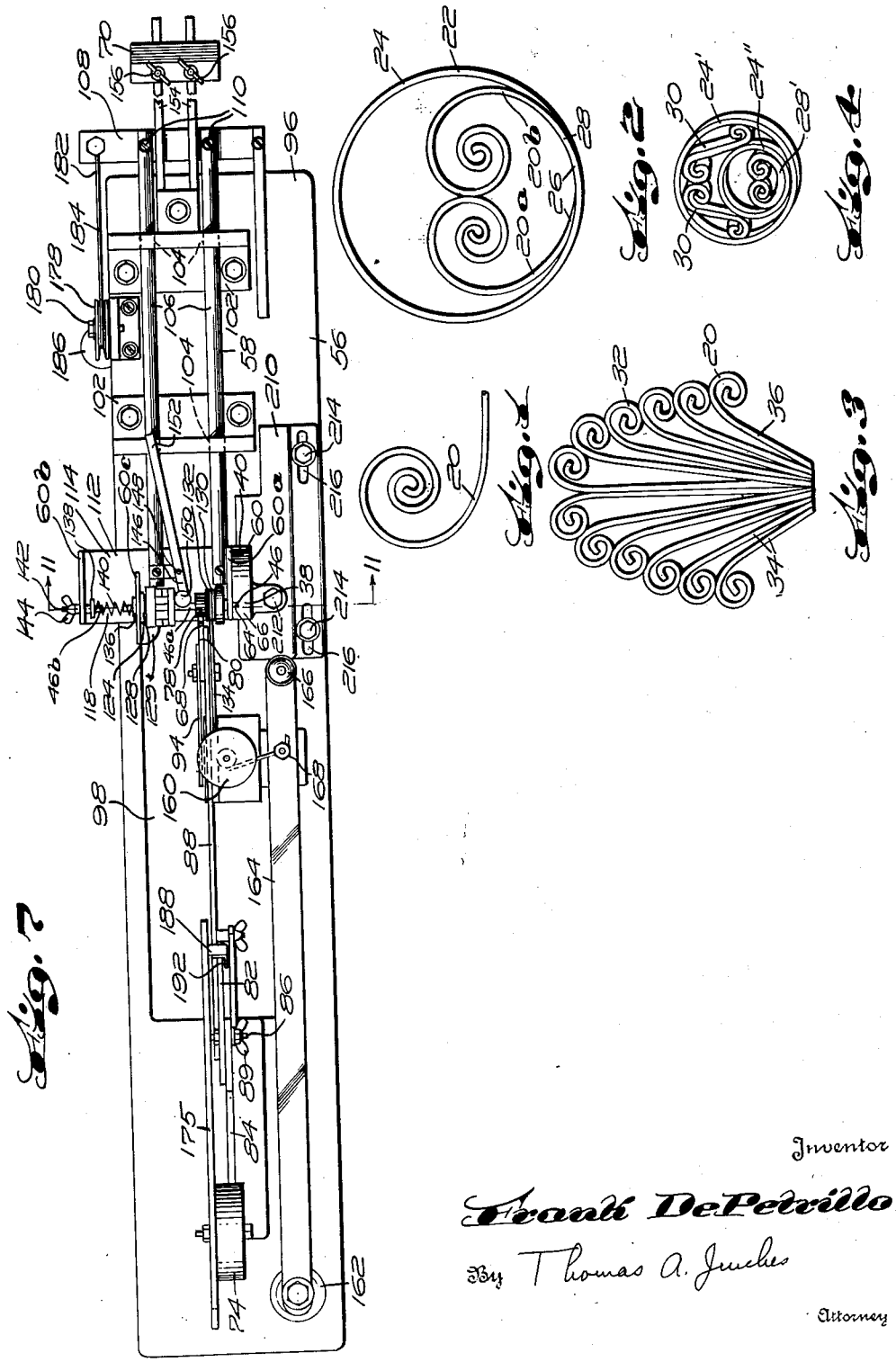
Inventor
Frank DePetrillo
By Thomas A. Juches
Attorney

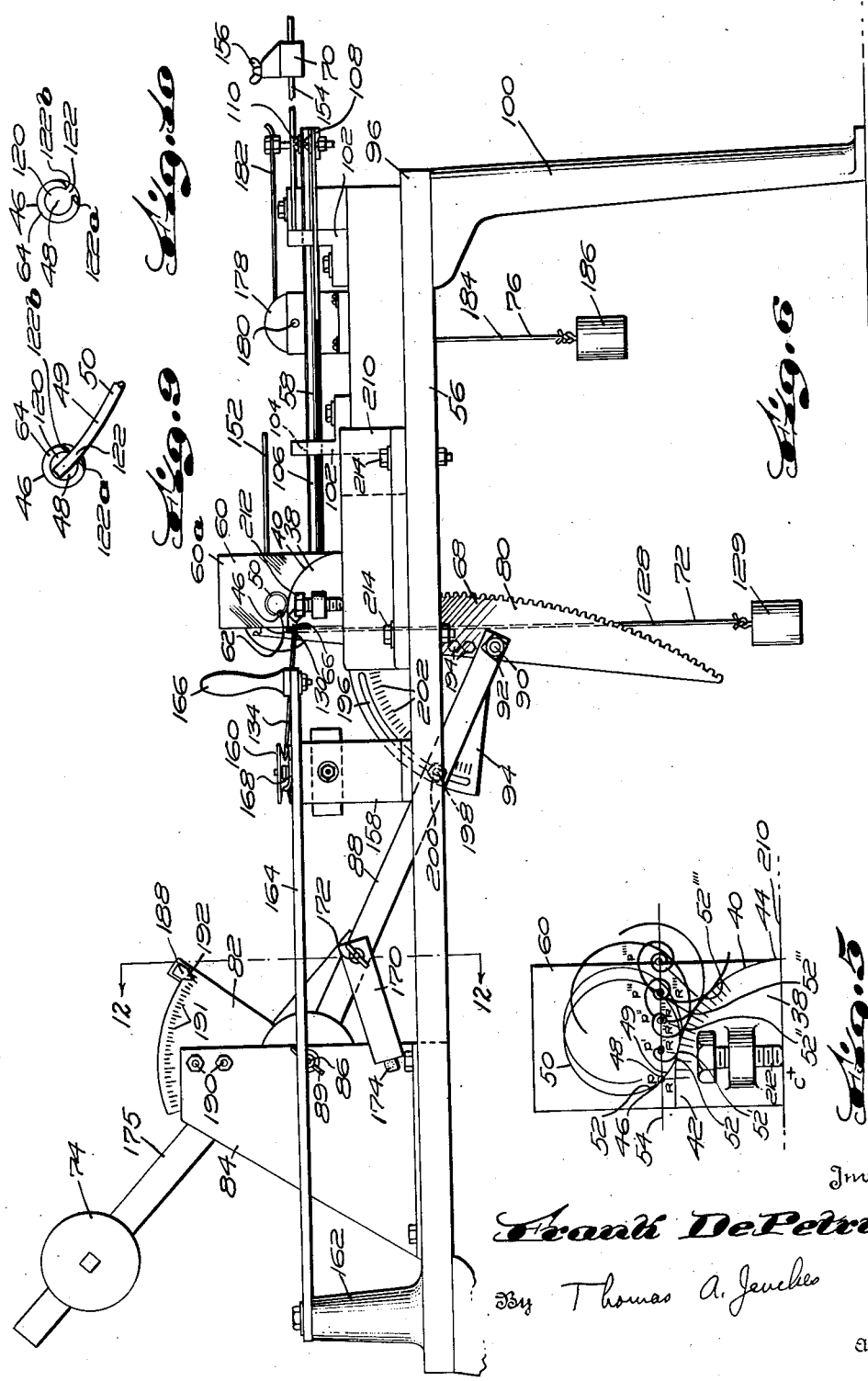

Aug. 19, 1952 F. DE PETRILLO 2,607,395
APPARATUS FOR THE MANUFACTURE OF ORNAMENTAL ROD SHAPES
Filed Sept. 3, 1947 4 Sheets-Sheet 3

INVENTOR.
Frank DePetrillo
BY
Max Schwartz
ATTORNEY

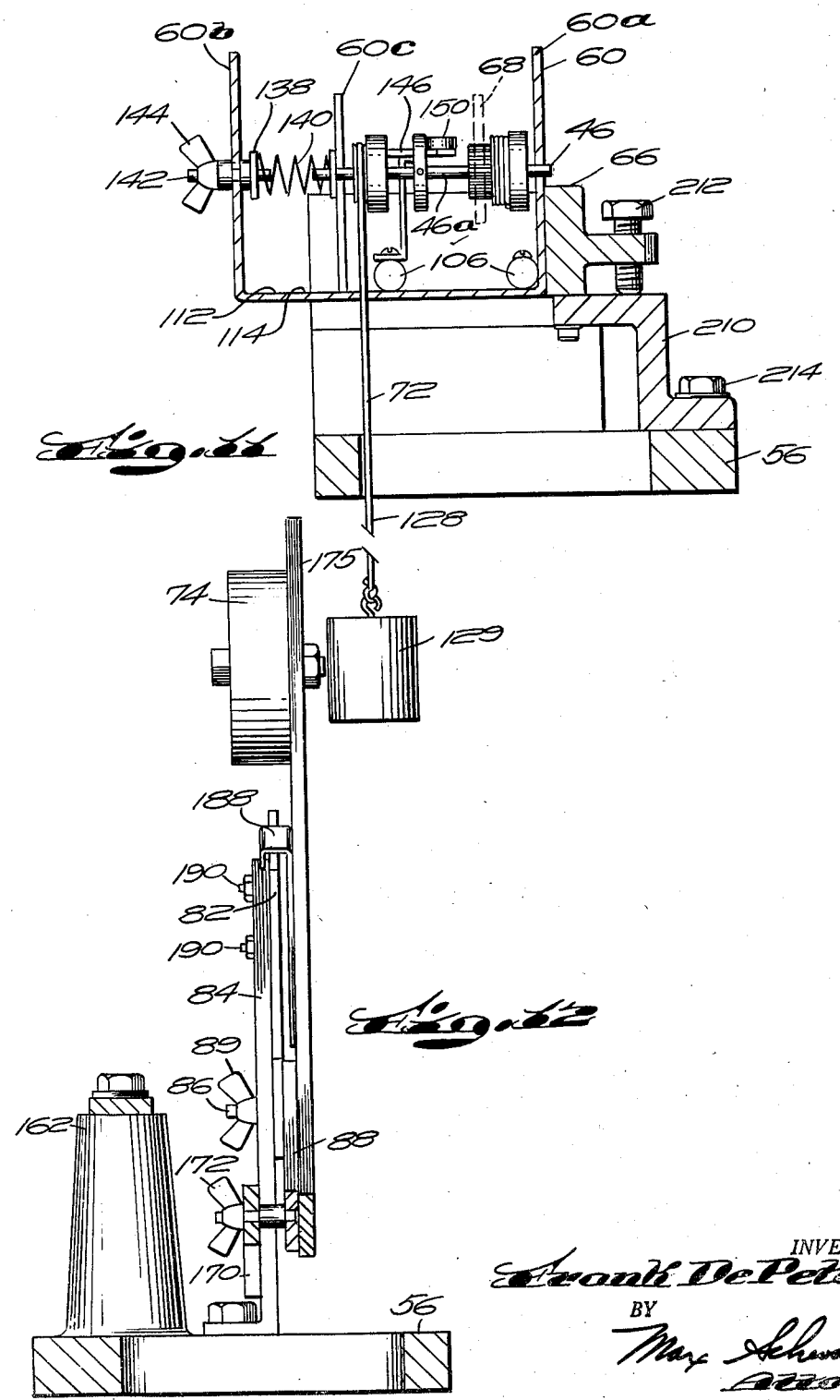

Patented Aug. 19, 1952

2,607,395

UNITED STATES PATENT OFFICE 2,607,395

APPARATUS FOR THE MANUFACTURE OF ORNAMENTAL ROD SHAPES

Frank De Petrillo, Providence, R. I.

Application September 3, 1947, Serial No. 771,992

11 Claims. (Cl. 153—40)

My invention relates to improvements in ornamental rods bent in the form of novel spirals and improved methods and apparatus for their manufacture.

Spirals have been known since the time of Archimedes and the word "spiral" is defined in the New Century Dictionary as "a plane curve which runs continuously around a fixed point or centre while constantly receding from or approaching it." The simplest spiral is that produced by looking at the end of a rolled blanket, whereby the rate of increase is equivalent to the thickness of the wire or material being rolled. In the metal bending arts, the only spirals which have been hitherto produced have been wires or rods bent by hand, only increasing in a slightly greater constant proportion, such as the spiral produced by the die shown in Patent No. 84,181, November 17, 1868. This does not produce an attractive spiral.

An object of my invention, therefore, is to provide a spiral which may be produced by machinery or by hand, having a constantly increasing radius of curvature varying in a definite relationship which can be automatically reproduced mechanically, i. e., with said radius of curvature varying with the successive lengths of radial lines joining the center of an arc, preferably a circular arc, and a point moving with rectilinear translation relative to said arc. Were it not for variations in the plasticity of the metal employed and if the force applied radially of the center of the cam to the portion of the wire striking it were transmitted so that the bending took place there, the distances of said point traveling in a straight line away from the successive contacting points on the surface of the downwardly curving arc would be the respective radii of curvature of the spirals at these points. However, in actual practice I have found that the bendings do not take place at the points of contact but substantially nearer the center of the rotating coil or rod, so that the successive radii of curvature merely vary with the successive lengths of radial lines joining the center of an arc and the point moving with rectilinear translation relative to said arc. It is obvious that this bending relationship can be brought into effect by a simple mechanical motion and I have found that rods so bent present a more attractive appearance than where the radius of curvature increases at a constant rate.

It is apparent that any desired shapes may be bent in accordance with my improved method, whether round wire, square wire, twisted wire, straight stock or otherwise to produce successively uniformly shaped ornamental rods of small size for use in the jewelry industry or of larger size for use in ornamental architecture.

It is also apparent that I can provide spirals having any desired length of stems, so that they can be joined together in pleasing groups. It is also apparent that I can provide single spirals, double similar spirals, double reverse spirals, spirals having any desired length of stems and many types of novel shapes including spirals etc., etc., where my improved machine is employed, by a simple adjustment of the machine.

Further features of my invention reside in the specific structure of a machine which I have designed for bending rods in my novel shaped spiral. To thoroughly synchronize the rotation of the spindle on which the split ring or rod is mounted to have the portions thereof come in successive contact with successive cam portions as the cam moves with rectilinear translation relative thereto, I preferably provide unitary means for rotating the spindle and advancing the spindle so that the curvature imparted to said spiral may vary in proportion to successive radii joining said moving axis with the center of the arc cam, which portions of the rod or ring successively abut the cam as they are bent. It is apparent that this feature thoroughly synchronizes the movements to provide a true relative rectilinear translation although this principle may be provided by other mechanisms and with arcuate cams having non-circular arcs.

Further features of my invention relate to details of construction of my improved machine, such as the means I have provided to limit longitudinal movement of the axis of rotation and the means I have provided to vary the rate of movement thereof as well as the specific means I have provided for rotating and advancing the spindle in synchronism, the means I have provided for holding a ring or rod to be bent in a socket in the spindle, the means I have provided for so releasing the rods from their socket, the automatic return means I have provided, the means I have provided to prevent backlash between the spindle gear and its driving means, the means I have provided for adjusting the quadrant gear relative to the spindle gear, the means I have provided to indicate the number of revolutions of the spindle dependent upon the stop limiting movement of the spindle support and the means I have provided to indicate the adjustment of the quadrant gear relative to the driven spindle gear, etc.

These and such other objects of my invention as may hereinafter appear will be best understood from a description of embodiments thereof, such as are shown in the accompanying drawings.

In the drawings,

Fig. 1 is a side elevation of an ornamental rod bent in the form of a spiral constructed in accordance with my invention.

Fig. 2 is a side elevation of a circular ornamental design having each end thereof bent in the shape of my improved spiral.

Fig. 3 illustrates an ornament made up of a plurality of spirals having different length stems made in accordance with my invention.

Fig. 4 is a view of an ornament of flat stock made up of spiral elements constructed in accordance with my invention, comprising similar double spirals and reverse double spirals.

Figure 8:
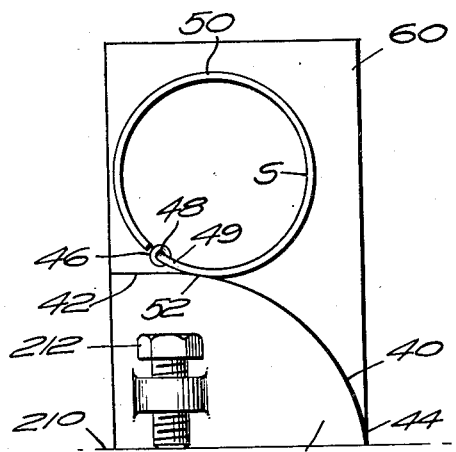
Figure 8A:
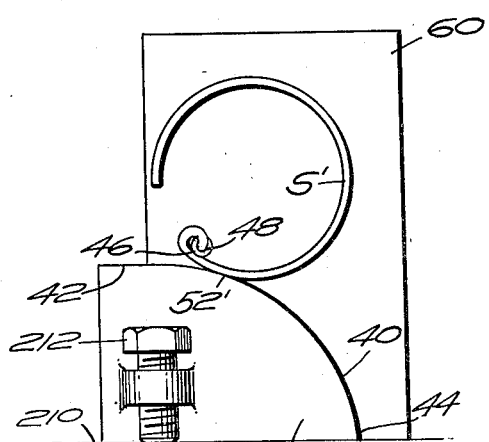
Figure 8B:
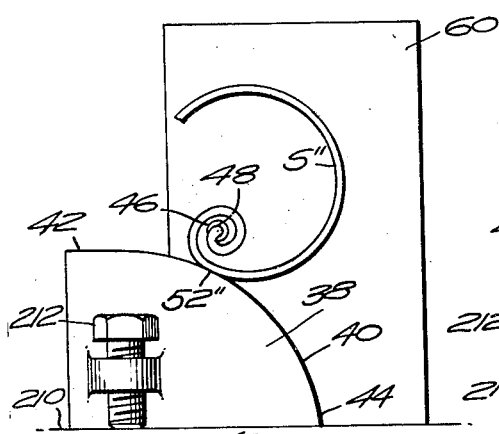
Figure 8C:
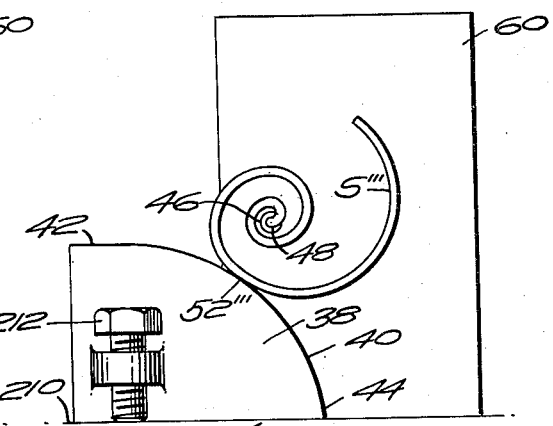
Figure 8D:
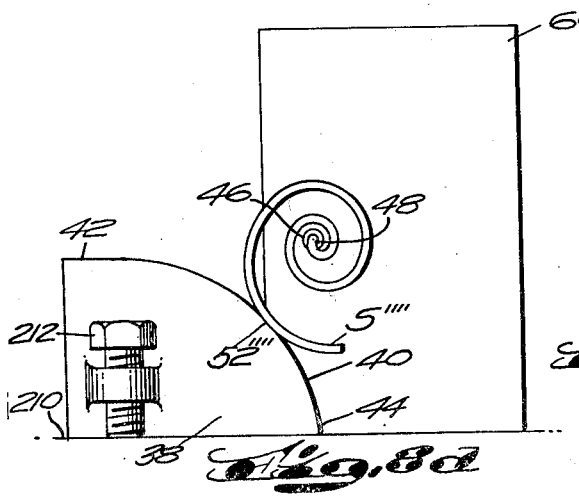

Fig. 5 diagrammatically illustrates my improved method of revolving a split circular wire ring on a rotating spindle, with portions thereof brought into successive contact with an arcuate cam while moving the axis of rotation of the spindle to which one end of the ring is attached with relative rectilinear translation relative to said cam.

Fig. 6 is a side elevation of my improved machine for carrying out said method.

Fig. 7 is a plan view of my improved machine.

Figs. 8, 8a, 8b, 8c and 8d are enlarged views illustrating the bending of the wire in accordance with the method shown in Fig. 5.

Fig. 9 is an end view of the rod and receiving socket I preferably employ in the end of the spindle showing the wire rod in attached position.

Fig. 10 is an end view similar to Fig. 9, with the rod removed.

Fig. 11 is an enlarged transverse section taken through line 11—11 on Fig. 7.

Fig. 12 is an enlarged transverse section taken on line 12—12 on Fig. 6.

In the drawings, wherein like characters of reference generally indicate like parts throughout, 20 generally indicates an ornamental rod bent in the form of a spiral, said spiral having a continuously increasing radius of curvature varying with successive lengths of radial lines joining the center of an arc and a point moving with rectilinear translation relative to said arc.

As shown more particularly in Fig. 6, such a rod may be made by bending a split ring, rod or other shape after inserting one end thereof in a radial socket in a spindle with successive portions of the rod coming in contact with an arcuate cam, preferably a circular arc cam while said spindle is being rotated and while the axis of rotation of the spindle has relative rectilinear translation with regard to said cam or more specically mounting one end of a rod or split ring radially of a spindle, rotating said spindle so that the end of the rod comes into contact with the periphery of a stationary arc cam and moving the axis of said rotating rod along a straight line tangent to said arc or parallel to said tangent to provide constantly increasing radial lines joining the center of said arc and said axis, whereby the curvature imparted to said rod may vary in proportion to successive radii joining said moving axis with the center of said arc. I employ the word "rod" in the claims to signify a piece of rod, regardless of its shape prior to bending, i. e. whether straight, round or otherwise.

As stated hitherto, most spirals have a radius which increases in a constant amount as it is wound around and so far as the applicant is aware, these are the only spirals which have been made hitherto. These have either been bent manually or formed in a die in a manner shown in U. S. Pat. No. 84,181 aforesaid.

The applicant is the first, therefore, to provide a spiral of the type described above and such a spiral 20 is shown in its pure form in Fig. 1. It is apparent that having reduced the spiral to a form dependent upon a mechanical or geometric action that it is possible to automatically make such spirals mechanically and successively reproduce the same spiral mechanically, a feature not possible when the spirals were made by hand.

In addition, it is believed that the applicant has provided a more attractive spiral than the prior art spirals which increased constant amounts and has reproduced somewhat the effect produced by the centrifugal force present in a revolving body such as the effect produced by a pinwheel firework. The applicant, therefore, believes that he has created a new article of manfacture by providing a solid shape of this well defined geometric and definable form which is more attractive in appearance than former spirals and which can be readily reproduced mechanically or by hand, but which is peculiarly adapted for mechanical reproduction as it may be made by standard mechnical motions.

I have shown in Fig. 6-10 my improved embodiment of machine for successively making these spirals in accordance with my improved method, Figs. 2, 3, and 4 illustrating various ornaments which may be made up either on my machine or from findings made by my machine. The ornamental shape 22 shown in Fig. 2 may be made from a wire three lengths the amount required for a circle of the same size, i. e., one length for the circle 24 and one length for each of the spirals 20a and 20b. It will be noted, however, that the ends 26 of the spiral of less curvature overlap for a slight distance adjacent portions of the circle 24. This is merely one of many typical novel shapes which may be made by my method. Leaving out the extra circle 24 in Fig. 2 and imagining that the ends 26 of the spirals 20a and 20b were joined together it will be seen that a double similar spiral 28 may be produced from the same piece of wire of two circular lengths. Referring to the ornament shown in Fig. 4 such a double similar spiral 28' can be seen at the bottom thereof and two double reverse spirals 30 can be seen at the top thereof.

As stated hitherto, the wire may be of any shape, cylindrical as shown in Figs. 1 and 2, or made of flat stock as shown in Fig. 3 or 4 or of any suitable shape in section such as square, oblong, etc., and may be made of twisted wire or of multi-strand wire, etc.

Fig. 3 illustrates a novel type of ornament 32 which may be made in accordance with my invention out of rods to provide the long stems 34. In this instance, rods are inserted in the spindle socket and the spiral 20 is made with the end of the rod then running off the cam so as to leave stems 34 of relatively large length to provide the units 36 having the spirals 20 at one end thereof and the stems 34 of varying length depending on the length of the wire initially used. Such units having stems of different lengths may be made up into any ornaments such as the attractive fan, fountain or peacock tail simulating ornament 32 shown in Fig. 3.

Fig. 4 is typical of another type of ornament which may be made up from flat stock in accordance with my invention employing the following elements i. e., an external ring 24', an internal ring 24'', the double similar spiral 28' contained within the smaller ring 24'', with said ring 24'' being contained within the lower portion of the external larger ring 24' and the double reverse spirals 30 contained within the upper portion of the large ring 24' above said internal ring 24''.

It is obvious that a double spiral may be readily made on my machine by suitable adjustment thereof either from a single ring or from a double ring, from a single by running it half way in one direction and then inserting the free end in the socket and again running the machine for said half distance and similarly for a wire of double length. The reverse spiral 30 may be made by bending the wire in the opposite direction on its second run.

It is apparent that many variations of novel shapes may be made by my invention.

Fig. 5 diagrammatically illustrates the method feature of my invention. A cam 38, having an arcuate surface 40 is preferably provided. I have shown in Fig. 5 a suitable cam for this purpose comprising a cam having a quarter-circular cam surface 40 with the higher portion 42 thereof at the rear thereof and with the cam surface 40 extending downwardly to the lower portion 44 at the front thereof.

A spindle 46 is provided having a suitable socket 48 for receiving one end 49 of a short piece of metal stock such as wire in the form of the split ring 50 shown, or alternatively in the form of a rod or other shapes, if desired, radially thereof.

It will then be obvious that the piece of stock 50 is so mounted that a portion 52 thereof comes in contact with the cam surface 40. The axis is then rotated while it is simultaneously moved forward on the line 54. As the axis of said rotating rod or wire piece rotates, it is moved forwardly along the straight line 54 which may be tangent to said arc but which in Fig. 5 is parallel to the actual tangent at a slightly raised distance above the tangent. It is obvious that as the axis of said rotating rod or wire is moved forwardly along the straight line 54 that successive portions of the piece of stock 50 will come into contact with successive portions of the cam and will provide continuously increasing radial lines R, R', R'', R''' and R'''' joining the center C of said arc or cam surface 40 with successive positions p, p', p'', p''' and p'''' of said axis whereby the curvature imparted to said rod may vary in proportion to successive radii joining said moving axis as it moves along the line 54 with the center c of said arc or cam surface 40 at the successive points 52, 52', 52'', 52''' and 52'''', the point of contact 52 occurring at the point p, the starting position of the axis of said rotating rod or wire piece.

It is apparent that the force applied to the wire is radial from the center C of the arc 40 and if the wire bent exactly at its point of contact, its definition would be simple. Due, however, to variations of the plasticity of the wire the actual bending does not take place at the successive points 52, 52', 52'', 52''' and 52'''', but takes place successively nearer the points p, p', p'', p''', and p''''. If the bending actually occurred at the successive points of contact the geometric definition would be simple. Due to the difference in bending as actually observed on the machine, a simple geometric definition is not possible, but it is obvious that the amount of bending varies in proportion to the successive radii R, R', R'', R''' and R'''' exterior of the actual radius of the cam surface or arc 40, or similar radii of an irregular arcuate shape as a partially elliptical or other shape, if employed.

Fig. 8 illustrates the actual successive shapes S, S', S'', S''' and S'''' actually produced as the ends of split ring 50 successively contact the cam points 52, 52', 52'', 52''' and 52'''' when employed in my improved machine with standard type small brass wire, of a diameter from .052 to .073 inch.

It is apparent that I have provided a novel method of plastically bending an ornamental rod or element in the form of a spiral with a continuously increasing radius of curvature varied in a prescribed manner which comprises revolving said rod 50 about an axis to which an end 49 of the rod is attached and relatively moving the axis of said rod with the opposite end 52 thereof remaining in constant contact with an arcuate cam 40, with rectilinear translation relative to said cam 40 or which comprises mounting the end of a rod or shape 50 radially of a spindle 46, rotating said spindle so that an opposite end or portion of the rod comes in constant contact with the periphery of an arcuate cam 40 and relatively moving said spindle and cam with rectilinear translation, more specifically moving the axis 46 of said rotating rod along a straight line 54 tangent to said arc 40 or as shown in Fig. 5 parallel to said tangent to provide constantly increasing radial lines R, R', R'', R''' and R'''' whereby the curvature imparted to said rod may vary with the lengths of said successive radii joining said moving axis with the center of said arc.

Thus, my improved method may be accomplished by hand, if desired, by rotating the rod and moving it by hand along the line 54 with an end 52 of the rod in contact with said cam, but it is obvious that as I have provided a device which functions along well defined lines of movement that my improved exact method lends itself to precision operation of a machine and I have shown in Figs. 6–10 a machine which I have devised for this purpose comprising a rotatable spindle 46 having a socket 48 or other means to secure the end 49 of the rod 50 thereto, the arcuate cam surface 40 preferably semi-circular and suitable means to relatively move the axis of said spindle 46 with rectilinear translation relative to said arcuate cam while maintaining the free end 52 of said rod in constant contact with said cam.

In the claims I employ the word "rod" to include a plasticizable freely bendable element, whether it comprises a straight member, a split ring or otherwise.

I have shown in Figs. 6–8, the improved type of machine I have provided for bending an ornamental rod whatever its exact shape may be, in the form of a spiral with a continuously increasing radius of curvature.

My improved embodiment of machine includes in combination a table 56, a forwardly facing arcuate cam surface 40 rigidly mounted on said table, a spindle support 58 longitudinally slidably mounted on said table having upwardly projecting side walls 60, having aligned bearing holes 62 therein, a spindle 46 rotatably mounted in said bearing holes so that the inner end 64 thereof projects interior of the inner sidewall above the rear end 66 of said cam, said end 64 having the socket 48 therein for holding an end of an ornamental rod, ring or shape in contact with said cam and means 68 to rotate said spindle 46 and to simultaneously move said support forwardly for rectilinear translation of said rotating spindle 46 relative to said cam surface 40. I also preferably employ in association therewith means for releasing the inner end 64 of said spindle from its bearing 62 for insertion and removal of rods 50, an adjustable stop member 70 mounted on said table to limit the forward movement of said spindle support 58, means 72 to return said support to its rearmost position, a counterbalance 74 for said return means, means 76 to prevent backlash between the operating gear 78 on said spindle and its driving segment 80 and means 82 to indicate the number of revolutions of said spindle dependent upon the adjustment of said stop, limiting movement of said support.

In my preferred embodiment, I preferably provide a single unitary means to rotate said spindle 46 and to advance said support, including the pinion gear 78 mounted on said spindle, the toothed segment gear 80 in mesh with said spindle gear 78, a supporting bracket 84 projecting vertically from the rear end of said table 56 having a pivot pin 86 transversely mounted therein, a radial rod 88 mounted on said pivot pin 86 and means comprising the bolt 90 and locknut 92 to pivotally adjustably attach the end of said radial arm 88 to substantially the center of said toothed segment 80, so that said segment gear 80 may be rigidly, adjustably, eccentrically mounted and I also provide means 94 to indicate the eccentricity of mounting of said segment gear 80 on said radial arm 88 to indicate the amount of forward movement of said rotating spindle 46 relative to said shaping cam surface 40. In my preferred embodiment said parts are preferably constructed as follows:

The table 56 comprises a substantially flat standard 96 having an enlarged cutaway portion 98 centrally thereof and means such as the legs 100 to mount said standard 96 in a raised position. The forwardly facing arcuate cam surface 40 is rigidly mounted on the inner side of said cutaway portion 98. In my preferred embodiment the spindle support 58 is preferably constructed as follows: I provide the supporting cross brackets 102 rigidly mounted on said standard 96 in front of said cutaway portion 98, having the horizontally spaced and aligned holes 104 therein, the spindle support 58 per se comprising the spaced rods 106 horizontally reciprocal in said cross bracket holes 104. A cross bar 108 is rigidly secured to the front ends of said rods such as by the screws 110 and a crossbar 112 is rigidly mounted on the rear ends of said rods above said cutaway portion 98. In the specific embodiment shown, the rear crossbar 112 comprises a bracket having a flat base 114, the upstanding inner sidewall 60$^a$, the upstanding outer side wall 60$^b$ and the upstanding intermediate outer wall 60$^c$ where employed, all of said walls 60$^a$, 60$^b$ and 60$^c$, where employed, having aligned bearing holes therein. The cross spindle 46 is preferably broken near the outer end thereof as at 118 to provide the inner main spindle portion 46$^a$ and the outer spindle portion 46$^b$. Said spindle whether broken or not is rotatably mounted in said bearing holes, so that the inner end 64 thereof projects exterior of said inner sidewall 60$^a$ above the rear end 42 of said cam surface 40.

Said inner end 64 has the radial socket 48 therein for holding the end of the ornamental shape 50. I have shown in the drawings the prefered type of socket I preferably employ. As shown in Figs. 9 and 10 said socket 48 comprises an axial hole 120 in the inner end 64 of said spindle 46, having a radial slot 122 in the wall thereof extending axially of said hole 120 providing the edges 122$^a$ and 122$^b$ extending axially along said slot. In the embodiment shown, at least one of said edges i. e., the edge 122$^b$ is sharpened substantially to a blade. Thus, in practice the end 49 of the shape 50 may be brought adjacent the end 64 of the spindle and inserted axially inwardly of the slot 122, providing the socket 48, the sharp edge 122$^b$ biting into the plastic wall of the rod 50 to firmly hold it in position as the spindle 46 rotates. While any suitable means may be provided to knock the rod 50 out of its socket 48, I preferably provide specific means for this purpose to be described later. I preferably provide as part of the return mechanism the pulley 124 mounted on said spindle 46$^a$ adjacent the intermediate cross bar side wall 60$^c$, having the end of a cord 128 attached thereto, which projects downwardly therefrom through said cutaway portion 98 and has mounted on the lower end thereof the return weight 129. The spindle gear 78 is rigidly mounted on said spindle 46 immediately outwardly of an operating pulley 130 adapted to have the end 132 of an operating cord 134 attached thereto. As stated, in order to provide means to readily remove the rods from the axial sockets 48, I preferably break the spindle 46 into the respective inner portion 46$^a$ and respective outer portion 46$^b$, and I mount a disk 136 on said inner spindle portion 46$^a$ near the broken portion 118 thereof and I mount a supplemental disk 138 on the outer spindle stub 46$^b$. I provide the coil spring means 140 abutting said respective disks 136 and 138 extending over said broken portion 118. The outer end of said spindle stub 46 shown is preferably threaded as at 142 and an adjusting thumb screw 144 is mounted on said threaded end 142 for adjusting the transverse movement of said outer spindle stub 46$^b$. To release the inner end 64 of said spindle to remove the rods 50 therefrom by abutment thereof against said inner wall 60$^a$ to urge them axially out of said socket 48, I provide the spindle inner end releasing bar 146 having its pivot 148 mounted on one of said longitudinal rods 106 having its rear end 150 pivotally secured to said inner spindle portion 46$^a$ and its free front end 152 forming a releasing handle whereby on movement of said handle inwards the inner end 64 of said inner spindle portion may be pushed outwards to be released from its bearing hole for removal of the shape 50 from its socket 48. On realignment of said inner end 64 with its bearing hole, said spring 140 may push said spindle inwardly so that the inner end 64 lies in operative position above the rear end 42 of said cam 40.

The adjustable stop member 70 comprises the block 70 adjustably mounted on the rods 154 rigidly mounted on the front end of said support 96 to project forwardly therefrom. The block 70 is provided with suitable holes for receiving the adjusting thumb screws 156 for securing said adjustable block in selected adjustable positions on said rods 154.

As stated, I provide means to rotate said spindle gear 78 or otherwise rotate said spindle and to preferably simultaneously move said spindle 46 forwardly for rectilinear translation of said rotating spindle 46 relative to said cam surface 40.

In my preferred embodiment I preferably provide the same means to rotate the spindle and to advance the spindle in its straight line path, although, if desired, these means may be made separately and I provide a manual actuation for said means although it is obvious that if desired power means to actuate said spindle rotating means and spindle moving means may be employed.

In the specific mechanism shown, I provide a single means to rotate said spindle gear 78 and to simultaneously move the spindle 46 forwardly for rectilinear translation of said rotating spindle relative to said cam. Said means includes said gear 78 rigidly mounted on the spindle 46 immediately exterior of the operating pulley 130. As explained hitherto, I provide the toothed segment gear 80 in mesh with said spindle gear 78 to move it forwardly with rectilinear translation. To so mount the toothed segment gear, I provide the supporting bracket plate 84 projecting vertically from the rear end of the table 56, having the pivot pin 86 transversely mounted therein. I rigidly mount the radial arm 88 on said pivot pin 86. For this purpose, the flat vertical bracket 84 has a bearing therein for the pivot pin 86 and said pivot pin comprises a bolt 86 having a head adapted to lie on the outer surface of said bracket, and the threaded end on the inner surface of said bracket. The inner end of said radial arm 88 has a hole for mounting thereof on said pivot pin between the bolt head and bracket 84 and the inner end of said pivot pin 86 is threaded and is provided with the wing nut 89 for mounting it on said bracket. As stated, the bolt 90 and locknut 92 are provided to pivotally attach the front end of the radial arm 88 to substantially the center of said toothed segment 80, so that said segment gear may be rigidly adjustably eccentrically mounted on the end of said radial arm.

As stated, I provide manual means to provide the power to rotate said spindle 46 and for this purpose in the preferred embodiment shown I provide the post 158 projecting upwardly from said standard substantially centrally of the inner side of said cutaway portion 86, having the pulley 160 mounted on the upper end thereof. I also provide the post 162 projecting upwardly from the rear end of said standard and an operating arm 164 horizontally pivotally mounted on said post 162 and projecting radially forwardly from said post, having an operating handle 166 on the front end thereof, said handle being pivotal horizontally inwardly from said standard. The operating cord 134 is passed around the pulley 160 and has its rear end attached to the front end of said operating handle as at 168, the front end of said operating cord 134 being passed around and connected to the operating pulley 130 on said spindle 46 in the manner explained.

It is thus apparent that when the radial arm 164 is moved laterally inwardly, the cord 134 will revolve the spindle 46, causing the spindle gear 78 to raise the segment 80, which, as it is raised, pushes the entire spindle support 58 forwardly to move the spindle 46 in relative rectilinear translation relative to said cam surface 40.

It is apparent that if desired other types of relative rectilinear translation may be employed and if desired power means may be provided to rotate the spindle and/or simultaneously advance it, such a power means being readily connectable to the cord 134 in place of the operating mechanism hitherto described. I also provide means to limit the downward movement of said segment gear 80, in the preferred embodiment comprising the stop link 170 having its front end pivotally mounted on the arm 88 on the pivot rod 172 and its rear end adapted to abut the square head screw 174 on the bracket 84, it being obvious that as the segment gear is depressed that said link 170 will abut the screw 174 to limit the downward movement of the segment.

As stated, I also provide a suitable return mechanism 72 for returning the spindle 46 and its support 58 to its rearmost position, comprising the pulley 124 mounted on said spindle 46 adjacent the intermediate crossbar sidewall 60c, having one end of a cord 128 attached thereto, which cord 128 projects downwardly through said cutaway portion 98 and has mounted on the lower end thereof the return weight 129. I may, if desired, provide a counterbalance for this return weight and for this purpose I provide the supplemental arm 175 pivotally mounted on said rod 172 for pivotally securing the front end of the link 170 to said radial arm 88, and extending rearwardly over the pivot pin 86 and having a counterweight 74 adjustably mounted thereon.

As stated, I also provide means 76 to prevent backlash between said toothed segment 80 and spindle gear 78. In my preferred embodiment, said means comprises a backlash preventing pulley 178 mounted on the pivot rod 180 projecting outwardly from the front end of said standard 96. I attach the front end 182 of a cord 184 to the front crossbar 108 on the front end of the spindle supporting rods 106 and I pass said cord 184 around said pulley 178 so that it may depend downwardly therefrom and attach the backlash preventing counterweight 186 to the lower end thereof. This counterweight 186 thus urges the spindle support 58 inwardly at all times to keep the teeth of the gear 78 in continuous engagement with the teeth of the segment 80, so as to prevent any backlash between said teeth.

As stated hitherto, I provide means 82 to indicate the number of revolutions of said spindle dependent on the adjustment of said stop block 70 limiting movement of the support 56. Said means comprises an indicating arm 188, having its lower end rigidly mounted on said radial arm pivot pin 86 to project upwardly of the outer edge of a sector shaped scale member 82 rigidly mounted on said supporting bracket 84 by the bolts 190 immediately adjacent said indicating arm 188 and having the indicia 191 on the upper surface of the inner edge thereof. Said indicating arm 188 has the pointer 192 projecting first forwardly over the top of said scale 82 and then downwardly of said indicia 191 on the inner surface of said scale. It is apparent that the position that the pointer 192 takes relative to said indicia 191 indicates the amount of forward movement imparted by the segment 80 to said spindle support 58, said movement being limited in the manner explained by adjustment of the stop block 70. It is obvious, therefore, that the block 70 may be set for different lengths of wire to be processed.

As stated, I also provide means 94 to indicate the eccentricity of the mounting of the segment gear 80 on the front of said radial arm 88 to regulate the speed of forward movement of said rotating spindle relative to said shaping cam surface 40, comprising the sector shaped scale 94 having its front edge rigidly fastened to the rear edge of said segment gear 80 by the bolts 194. Said sector shaped scale 94 has an arcuate slot 196 near the periphery thereof through which a supporting bolt 198 projects. Said bolt 198 has its outer end suitably threaded and a locknut 200 mounted thereon so that said segment may be firmly attached in adjusted positions on said radial arm. The scale also has the indicia 202 mounted thereon in arcuate formation interior of said slot 196 and the registration of the lower edge of said arm 88 against said scale thus indicates the eccentricity of mounting of said segment 80 on said radial arm 88. It is thus apparent that the more away from the normal the segment 80 is mounted on the end of said radial arm, the greater will be the forward movement imparted to the spindle 46 and hence the greater the speed of the movement of the spindle forward relative to said shaping cam. Thus, we have found that the amount of curvature imparted to the spiral varies inversely to the speed, a lesser amount of curvature being applied with a greater speed. Therefore, this adjustment may be said to vary the amount of curvature in successively processed spirals of the same length or may be adjusted along with the adjustment of the stop 70 to provide the same curvature for spirals of different size and length.

Every time that the quadrant 80 is adjusted, it is desirable to adjust the position of the cam 38 so that the socket 48 will be in the same relative position relative to the cam and for this purpose the cam 38 is rigidly attached to a cam block 210 by a bolt 212 and the block 210 is longitudinally adjustable relative to said support 56, by adjusting the positions of the locking bolts 214 in the longitudinal locking slots 216 in the block prior to screwing them fast to the table 56. I have found, however, that the same cam 38 may be retained to make any desired variations in size of the rods produced, although if desired cams 38 of different shapes may be substituted therefor as previously stated.

I have already explained how the different shapes shown in Figs. 1–4 may be made on my improved machine. To vary the amount of increase of the spiral, the setting of the segment 80 on the end of the radial arm is varied. The more it is bent inwardly away from the normal the greater the increase in curvature of the spiral. Variations in the position of the block 70 merely affect the length of the wire bent and thus if it be desired to create similar shapes for different sizes, all three adjustments, i. e., adjustment of the segment 80 on the end of the radial arm 88, adjustment of the block 70 and adjustment of the cam 40 hitherto explained must be made.

As stated, one or more spirals may be made out of a single ring, such as the single spiral shown in Fig. 1, or the double similar spiral shown in Fig. 2, and the double reverse spirals shown in Fig. 4. If desired, any number of spirals may be made out of a single ring, but I have found that for small rings it is practical to make four only.

In operation, it is only necessary to insert the end of a rod or ring within the socket 48, as shown in Fig. 9, so that a portion 52 of the rod or ring abuts the cam surface 40, the handle 166 is pulled inwardly and the desired spiral is formed.

If it be desired to eject the rod from the socket 48, the ejecting handle 152 is pulled inwardly which pulls the interior end 64 of the spindle portion 46ª through its bearing ejecting the formed shape 50 therefrom. The end 64 is again realigned with its bearing when the spring 118 pushes it inwards and the hand may be removed from the handle 166 to permit the return weight 129 to bring the machine back to starting position. The same operation may be repeated as long as desired to successively produce similar spirals. When it is desired to produce different shaped spirals, the machine is adjusted in the manner hitherto described.

It is apparent, therefore, that I have provided a novel type of spiral ornament, a novel method of bending shapes into different spirals and a novel machine for so bending said shapes, with the advantages set forth hitherto.

It is understood that my invention is not limited to the specific embodiments shown or methods described and that various deviations may be made therefrom without departing from the spirit and scope of the appended claims.

What I claim is:

1. In a machine for bending an ornamental rod in the form of a spiral with a continuously increasing radius of curvature, in combination, a table, a forwardly facing arcuate cam rigidly mounted on said table, a spindle support longitudinally slidably mounted on said table having upwardly projecting side walls, having aligned bearing holes therein, a spindle rotatably mounted in said bearing holes so that the inner end thereof projects interior of the inner side wall above the rear end of said cam, said end having a socket therein for holding an end of an ornamental rod in contact with said cam, and means to rotate said spindle, and to simultaneously move said support forwardly for rectilinear translation of said rotating spindle relative to said cam.

2. In a machine for bending an ornamental rod in the form of a spiral with a continuously increasing radius of curvature, in combination, a table, a forwardly facing arcuate cam rigidly mounted on said table, a spindle support longitudinally slidably mounted on said table having upwardly projecting side walls, having aligned bearing holes therein, a spindle rotatably mounted in said bearing holes so that the inner end thereof projects interior of the inner side wall above the rear end of said cam, said end having a socket therein for holding an end of an ornamental rod in contact with said cam, comprising an axial bore in the inner end of said spindle having a radial slot in the wall thereof extending axially of said bore and having at least one edge thereof sharpened substantially to a blade, and means to rotate said spindle, and to simultaneously move said support forwardly for rectilinear translation of said rotating spindle relative to said cam.

3. In a machine for bending an ornamental rod in the form of a spiral with a continuously increasing radius of curvature, in combination, a table, a forwardly facing substantially quarter-circular cam rigidly mounted on said table, a spindle support longitudinally slidably mounted on said table having upwardly projecting side walls, having aligned bearing holes therein, a spindle rotatably mounted in said bearing holes so that the inner end thereof projects interior of the inner side wall above the rear end of said cam, said end having a socket therein for holding an end of an ornamental rod in contact with said cam, and means to rotate said spindle, and to simultaneously move said support forwardly for rectilinear translation of said rotating spindle relative to said cam.

4. In a machine for bending an ornamental rod in the form of a spiral with a continuously increasing radius of curvature, in combination, a table, a forwardly facing arcuate cam rigidly mounted on said table, a spindle support longitudinally slidably mounted on said table having upwardly projecting side walls, having aligned bearing holes therein, a spindle rotatably mounted in said bearing holes so that the inner end thereof projects interior of the inner side wall above the rear end of said cam, said end having a socket therein for holding an end of an ornamental rod in contact with said cam, and means to rotate said spindle, and means to simultaneously move said support forwardly for rectilinear translation of said rotating spindle relative to said cam.

5. In a machine for bending an ornamental rod in the form of a spiral with a continuously increasing radius of curvature, in combination, a table, a forwardly facing substantially quarter-circular cam rigidly mounted on said table, a spindle support longitudinally slidably mounted on said table having upwardly projecting side walls, having aligned bearing holes therein, a spindle rotatably mounted in said bearing holes so that the inner end thereof projects interior of the inner side wall above the rear end of said cam, said end having a socket therein for holding an end of an ornamental rod to be brought into contact with said cam, comprising an axial bore in the inner end of said spindle having a radial slot in the wall thereof extending axially of said bore and having at least one edge thereof sharpened substantially to a blade, means for releasing the inner end of said spindle from its bearing for removal of rods from said socket and means to rotate said spindle and to simultaneously move said carriage forwardly for rectilinear translation of said rotating spindle relative to said cam.

6. In a machine for bending an ornamental rod in the form of a spiral with continuously increasing radius of curvature, in combination, a table, a forwardly facing arcuate cam rigidly mounted on said table, a spindle support longitudinally slidably mounted on said table having upwardly projecting side walls, having aligned bearing holes therein, a spindle rotatably mounted in said bearing holes so that the inner end thereof projects interior of the inner side wall above the rear end of said cam, said end having a socket therein for holding an end of an ornamental rod to be brought into contact with said cam, means to rotate said spindle and to simultaneously move said carriage forwardly for rectilinear translation of said rotating spindle relative to said cam and means to return said support to its rearmost position.

7. In a machine for bending an ornamental rod in the form of a spiral with a continuously increasing radius of curvature, in combination, a table, a forwardly facing arcuate cam rigidly mounted on said table, a spindle support longitudinally slidably mounted on said table, having upwardly projecting side walls, having aligned bearing holes therein, a spindle rotatably mounted in said bearing holes so that the inner end thereof projects interior of the inner side wall above the rear end of said cam, said end having a socket therein for holding an end of an ornamental rod to be brought into contact with said cam, a gear rigidly mounted on said spindle, means to rotate said spindle and to simultaneously move said carriage forwardly for rectilinear translation of said rotating spindle relative to said cam, comprising a toothed segment gear in mesh with said spindle gear, a supporting bracket projecting vertically from the rear end of said table, having a pivot pin transversely mounted therein, a radial rod mounted on the pivot pin and means to pivotally adjustably attach the end of said radial arm to substantially the center of said toothed segment gear, so that said segment gear may be rigidly, adjustably, eccentrically mounted, and means to indicate the eccentricity of the mounting of said segment gear on said radial arm to regulate the amount of forward movement of said rotating spindle relative to said shaping cam.

8. In a machine for bending an ornamental rods in the form of a spiral with a continuously increasing radius of curvature, in combination, a substantially flat standard having an elongated cutaway portion centrally thereof, means to mount said standard in a raised position, a forwardly facing arcuate cam rigidly mounted on one side of said cutaway portion, supporting cross brackets rigidly mounted on said standard in front of said cutaway portion having horizontally spaced and aligned holes therein, a longitudinally slidable spindle support comprising rods horizontally reciprocal in said cross brackets, a cross bar rigidly secured to the front ends of said rods and a cross bar rigidly mounted on the rear ends of said rods above said cutaway portion, having upwardly projecting side walls adjacent the rear end thereof having aligned bearing holes therein, a spindle rotatably mounted in said bearing holes so that the inner end thereof projects interior of said inner side wall above the rear end of said cam, said inner end having a socket therein for holding the end of an ornamental rid, a gear rigidly mounted on said spindle, means to rotate said spindle and to simultaneously move said carriage forwardly for rectilinear translation of said rotating spindle relative to said cam, comprising a toothed segment gear in mesh with said spindle gear, a supporting bracket projecting vertically from the rear end of said standard, having a pivot pin transversely mounted therein, a radial rod mounted on the pivot pin and means to pivotally adjustably attach the end of said radial rod to substantially the center of said toothed segment gear, so that said segment gear may be rigidly adjustably eccentrically mounted.

9. In a machine for bending an ornamental rod in the form of a spiral with a continuously increasing radius of curvature, in combination, a substantially flat standard having an elongated cutaway portion centrally thereof, means to mount said standard in a raised position, a forwardly facing arcuate cam rigidly mounted on one side of said table, a spindle support longitudinally slidably mounted on said table, having upwardly projecting side walls adjacent the rear end thereof, having aligned bearing holes therein, a spindle rotatably mounted in said bearing holes so that the inner end thereof projects interior of said inner side wall above the rear end of said cam, said inner end having a socket therein for holding the end of an ornamental rod, a gear rigidly mounted on said spindle, means to rotate said spindle, and to simultaneously move said carriage forwardly for rectilinear translation of said rotating spindle relative to said cam, comprising a toothed segment gear in mesh with said spindle gear, a supporting bracket projecting vertically from the rear end of said standard, having a pivot pin transversely mounted therein, a radial rod mounted on the pivot pin and means to pivotally adjustably attach the end of said radial rod to substantially the center of said toothed segment gear, so that said segment gear may be rigidly adjustably eccentrically mounted and means to indicate the eccentricity of the mounting of said segment gear on said radial arm to regulate the amount of forward movement of said rotating spindle relative to said shaping cam, comprising a sector shaped scale projecting rearwardly from said segmental gear having indicia thereon and a pointer mounted on the radial arm to designate the angularity of eccentricity of the mounting of said segmental gear thereon.

10. In a machine for bending an ornamental rod in the form of a spiral with a continuously increasing radius of curvature, in combination, a substantially flat standard having an elongated cutaway portion centrally thereof, means to mount said standard in a raised position, a forwardly facing arcuate cam rigidly mounted on one side of said table, a spindle support longitudinally slidably mounted on said table, having upwardly projecting side walls adjacent the rear end thereof, having aligned bearing holes therein, a spindle rotatably mounted in said bearing holes so that the inner end thereof projects interior of said inner side wall above the rear end of said cam, said inner end having a socket therein for holding the end of an ornamental rod, a gear rigidly mounted on said spindle, a supplemental pulley mounted on said spindle, means to rotate said spindle, and to simultaneously move said carriage forwardly for rectilinear translation of said rotating spindle relative to said cam, comprising a toothed segment gear in mesh with said spindle gear, a supporting bracket projecting vertically from the rear end of said standard, having a pivot pin transversely mounted therein, a radial rod mounted on the pivot and means to pivotally adjustably attach the end of said radial rod to substantially the center of said toothed segment gear, so that said segment gear may be rigidly adjustable eccentrically mounted, a cord attached to said supplemental spindle pulley and extending downwardly through said cutaway portion having a return weight on the lower end thereof.

11. In a machine for bending an ornamental rod in the form of a spiral with a continuously increasing radius of curvature, in combination, a substantially flat standard having an elongated cutaway portion centrally thereof, means to mount said standard in a raised position, a forwardly facing arcuate cam rigidly mounted on one side of said table, a spindle support longitudinally slidably mounted on said table, having upwardly projecting side walls adjacent the rear end thereof, having aligned bearing holes therein, a spindle rotatably mounted in said bearing holes so that the inner end thereof projects interior of said inner side wall above the rear end of said cam, said inner end having a socket therein for holding the end of an ornamental rod, a gear rigidly mounted on said spindle, a supplemental pulley mounted on said spindle, means to rotate said spindle, and to simultaneously move said carriage forwardly for rectilinear translation of said rotating spindle relative to sad cam, comprising a toothed segment gear in mesh with said spindle gear, a supporting bracket projecting vertically from the rear end of said standard, having a pivot pin transversely mounted therein, a radial rod mounted on the pivot pin and means to pivotally adjustably attach the end of said radial rod to substantially the center of said toothed segment gear, so that said segment gear may be rigidly adjustably eccentrically mounted, a cord attached to said supplemental spindle pulley and extending downwardly through said cutaway portion having a return weight on the lower end thereof, and a supplemental arm having a counterweight thereon pivotally mounted on said radial arm pivot pin to counter balance the return weight.

FRANK DE PETRILLO.

REFERENCES CITED

The following references are of record in the file of this patent:

UNITED STATES PATENTS

| Number | Name | Date |
|---|---|---|
| 240,288 | Wagner | Apr. 19, 1881 |
| 277,988 | Burk | May 22, 1883 |
| 378,334 | Pemberton | Feb 21, 1888 |
| 548,903 | Wood | Oct. 29, 1895 |
| 691,598 | Christopherson | Jan. 21, 1902 |
| 725,026 | Boehm | Apr. 14, 1903 |
| 904,563 | Rau | Nov. 24, 1908 |
| 1,192,631 | Hick | July 25, 1916 |
| 1,503,272 | Lewellyn | July 29, 1924 |
| 1,627,604 | Hittle | May 10, 1927 |
| 1,790,218 | Appleby | Jan. 27, 1931 |
| 1,976,093 | Raymond | Oct. 9, 1934 |
| 2,218,620 | Lyons | Aug. 30, 1938 |

FOREIGN PATENTS

| Number | Country | Date |
|---|---|---|
| 466,812 | France | Mar. 13, 1914 |
| 550,923 | Great Britain | Feb. 1, 1943 |